(12) United States Patent
Albach et al.

(10) Patent No.: US 9,000,062 B2
(45) Date of Patent: Apr. 7, 2015

(54) SEMI-RIGID POLYURETHANE FOAMS AND PROCESSES FOR THEIR PRODUCTION AND USE

(71) Applicant: Bayer Intellectual Property GmbH, Monheim (DE)

(72) Inventors: Rolf Albach, Köln (DE); Monika Haselbach, Köln (DE); Harald Fietz, Leverkusen (DE)

(73) Assignee: Bayer Intellectual Property GmbH, Monheim (DE)

( * ) Notice: Subject to any disclaimer, the term of this patent is extended or adjusted under 35 U.S.C. 154(b) by 154 days.

(21) Appl. No.: 13/766,869

(22) Filed: Feb. 14, 2013

(65) Prior Publication Data
US 2013/0209778 A1 Aug. 15, 2013

(30) Foreign Application Priority Data
Feb. 15, 2012 (EP) ..................... 12155553

(51) Int. Cl.
| | | |
|---|---|---|
| C08G 18/50 | (2006.01) | |
| C08G 18/48 | (2006.01) | |
| C08G 18/65 | (2006.01) | |
| C08G 18/66 | (2006.01) | |
| C08G 18/06 | (2006.01) | |
| B32B 5/18 | (2006.01) | |
| C08G 18/32 | (2006.01) | |
| C08G 101/00 | (2006.01) | |

(52) U.S. Cl.
CPC . C08G 18/06 (2013.01); B32B 5/18 (2013.01); C08G 18/5033 (2013.01); C08G 18/482 (2013.01); *C08G 2101/00* (2013.01); *C08G 2101/0016* (2013.01)

(58) Field of Classification Search
None
See application file for complete search history.

(56) References Cited

U.S. PATENT DOCUMENTS

| | | | |
|---|---|---|---|
| 4,569,952 A | 2/1986 | Radovich et al. | |
| 5,030,758 A * | 7/1991 | Dietrich et al. | 564/399 |
| 5,530,033 A | 6/1996 | Lunardon et al. | |
| 5,547,998 A | 8/1996 | White, III et al. | |
| 5,840,781 A | 11/1998 | Dietrich et al. | |
| 6,339,110 B1 * | 1/2002 | Cappella et al. | 521/131 |
| 6,506,813 B1 * | 1/2003 | Parfondry et al. | 521/174 |
| 7,691,913 B2 * | 4/2010 | Moore et al. | 521/167 |
| 7,893,124 B2 | 2/2011 | Emge et al. | |
| 8,293,807 B2 | 10/2012 | Emge et al. | |
| 2007/0232712 A1 | 10/2007 | Emge et al. | |
| 2009/0209671 A1 * | 8/2009 | Emge et al. | 521/98 |
| 2011/0218258 A1 * | 9/2011 | Frericks et al. | 521/82 |
| 2011/0263737 A1 * | 10/2011 | Fricke et al. | 521/128 |

FOREIGN PATENT DOCUMENTS

| | | |
|---|---|---|
| CA | 2144232 A1 | 9/1995 |
| CA | 2157829 A1 | 3/1996 |
| DE | 19502578 A1 | 8/1996 |
| DE | 102004048728 A1 | 4/2006 |
| DE | 102005011572 A1 | 9/2006 |
| EP | 0477920 A2 | 4/1992 |
| EP | 671425 A1 | 9/1995 |
| EP | 1138709 A1 | 10/2001 |
| GB | 1398185 A | 6/1975 |
| GB | 2308373 A | 6/1997 |
| WO | WO-94/15983 A1 | 7/1994 |
| WO | WO-2006037540 A2 | 4/2006 |
| WO | WO-2008/031757 A1 | 3/2008 |

OTHER PUBLICATIONS

Machine Translation of EP1138709A1. Oct. 4, 2001.*

* cited by examiner

Primary Examiner — Robert C Boyle
Assistant Examiner — Stephen Rieth
(74) Attorney, Agent, or Firm — Drinker Biddle & Reath LLP

(57) ABSTRACT

Semi-rigid polyurethane foams having a density of 90 to 180 kg/m$^3$ and a compressive strength of 20 to 95 kPa are produced by reacting a polyisocyanate with an isocyanate-reactive component that includes an o-toluenediamine initiated polyether polyol. These foams are particularly useful as composites for automotive interior components.

10 Claims, No Drawings

SEMI-RIGID POLYURETHANE FOAMS AND PROCESSES FOR THEIR PRODUCTION AND USE

RELATED APPLICATIONS

This application claims benefit of European application 12155553.6, filed Feb. 15, 2012, which is incorporated herein by reference in its entirety for all its useful purposes.

BACKGROUND OF THE INVENTION

The present invention is directed to semi-rigid polyurethane foams having a density of 90 to 180 kg/m$^3$ and a compressive strength of 20 to 95 kPa and to processes for their production and use.

Semi-rigid polyurethane foams are known and have been extensively described (Kunststoffhandbuch, volume 7, "Polyurethanes", Carl Hanser Publishers Munich, Vienna, 3rd edition, 1993, chapter 5.4, and DE-A 10 2005 011 572). They are produced by reacting polyisocyanates with compounds having two or more isocyanate-reactive hydrogen atoms. These foams are particularly useful in the interior of motor vehicles for making instrument panels, door side parts, center consoles, arm rests and door rests. Semi-rigid polyurethane foams are frequently used in the form of so-called composite elements. Composite elements are made up of self-supporting films or sheets which are usually made of polyurethane or PVC and a backing, which is usually made of polycarbonate/ABS or fiberglass-reinforced polypropylene that are back-foamed with semi-rigid polyurethane foams.

Polyurethane foams having very good mechanical properties may be obtained by selection of suitable reaction components and reaction component mixing ratios. HCFC blowing agents are not used wherever possible for ecological reasons. Water is frequently used as an alternative blowing agent. The use of water as the blowing agent has disadvantages as well as advantages. Water-blown foams usually have worse mechanical properties than foams produced with an HCFC blowing agent. In an effort to remedy these defects and to obtain equivalent or improved mechanical properties, the isocyanate-reactive or polyol component of the foams has been extensively optimized.

The use of o-TDA-based polyalkylene oxides to produce rigid polyurethane foams is well known and has been extensively described. In the rigid foams produced with o-TDA initiated polyether polyols, the monomers typically bond predominantly via urethane groups, particularly with secondary hydroxyl functions, and crosslink via the functionality of the polyether polyols and polyisocyanates.

In contrast, semi-rigid polyurethane foams are obtained by reacting high molecular weight, preferably polyester polyols and/or polyether polyols and optionally crosslinking and/or chain-extending agents with organic and/or modified organic polyisocyanates. In these semi-rigid foams, the monomers typically bond predominantly via polyol and isocyanate groups and less via urethane groups and particularly with primary hydroxyl functions. The degree of crosslinking is low, and the average functionality of the isocyanate-reactive components is normally below three.

Polyalkylene oxides produced from 22-27 wt % of diaminotoluene and 73-78 wt % of alkylene oxides are widely used as components in rigid polyurethane foams (U.S. Pat. No. 5,547,998), flexible SRIM articles (GB-A 2308373 and CA 2157829) and sprayable elastomers. Typical rigid foams contain 2-3 kg/m$^3$ of integrated diaminotoluene. Polyols having smaller fractions of diaminotoluene in the molecule are rarer.

EP-A 1138709 describes polyols having 5-14 wt % of diaminotoluene in the polyalkylene oxide molecule. WO 2006/037540 describes rigid foams based on mixtures of diaminotoluene-based polyols having various chain lengths.

EP-A 671425 describes the production of high-resilience flame-retardant flexible foams (compressive strength<9 kPa at 40% compression) having densities of 30-60 kg/m$^3$. The polyether polyols used to produce these foams are based on only 2-3 wt % to 12 wt % of diaminotoluene and 97-98 wt % to 88 wt % of ethylene oxide and/or propylene oxide. The flexible foams described in EP-A 671425 contain only 33 g of chemically integrated diaminotoluene per cubic meter of foam.

GB-A 1398185 claims comparable polyols having 1-4 wt % of diaminotoluene and 96-99 wt % of alkylene oxides. The reported equivalent weights of 750-3500 g/mol are arithmetically equivalent to an OH number range of 16-75 mg KOH/g. These polyols are useful for producing flexible foams having densities of <30 kg/m$^3$ and compressive strengths of 3.1-10.4 kg/m$^2$.

U.S. Pat. No. 4,569,952 describes the use of from 8 to 25 wt % of low molecular weight diaminotoluene-based polyethers for producing very lightweight flexible foams having a density of 35-60 kg/m$^3$ (2.14-3.79 lb./ft$^3$).

SUMMARY OF THE INVENTION

The problem addressed by the present invention was that of producing semi-rigid polyurethane foams having improved properties, especially improved resilience and reduced compressive strength and also low density, which retain their advantageous properties even when water is used as blowing agent.

The problem was surprisingly solved by the semi-rigid polyurethane foams of the present invention in which specific polyol components based on 2,3- and 3,4-diaminotoluene are used. The 2,3- and 3,4-diaminotoluene used to produce these polyols are unavoidably co-generated during the production of toluene diisocyanate. The use of polyol components based on 2,3- and 3,4-diaminotoluene has made it possible to produce polyurethane foams having low densities and higher diaminotoluene contents. Simple alkylene oxides such as ethylene oxide or propylene oxide can be used to produce the polyols required in the present invention without sacrificing good mechanical properties. It has surprisingly been found that complete reaction of all NH groups in the diaminotoluene with the alkylene oxides is unnecessary thereby enabling the use of polyols having NH as well as OH end groups. No loss in performance characteristics has been observed.

DETAILED DESCRIPTION OF THE INVENTION

The present invention is directed to semi-rigid polyurethane foams having a density of 90 to 180 kg/m$^3$, preferably 120 to 160 kg/m$^3$ and a compressive strength of from 20 to 95 kPa, preferably 35 to 85 kPa. These foams are the reaction products of: (a) one or more organic polyisocyanates and/or modified organic polyisocyanates based on diphenylmethane diisocyanate and/or polyphenyl polymethylene polyisocyanate, and (b) an isocyanate-reactive component formed in the presence of (c) a catalyst, (d) 1 to 5 wt %, preferably 1.5 to 3.5 wt % and more preferably 2 to 3 wt % (based on total components (b) to (e)) of water and (e) optionally, auxiliaries and/or addition agents. The isocyanate-reactive component (b) includes:

(1) 84 to 99.5 wt %, preferably 90 to 98 wt % (based on total weight of component (b)) of at least one polyether polyol based on ethylene oxide and/or propylene oxide and having a weight-average equivalent weight of ≥1000 to 3000 g/mol, preferably of ≥1200 to 2000 g/mol and an average functionality of 2 to 8, (2) 0.5 to 6 wt %, preferably 1 to 5 wt % (based on total weight of component (b)) of at least one polyether polyol based on ethylene oxide and/or propylene oxide with diaminotoluene as starter and having a weight-average equivalent weight of 90-190 g/mol, preferably of 100 to 160 g/mol and more preferably of 110 to 150 g/mol, and (3) 0 to 10 wt % (based on total weight of component(b)) of at least one chain-extender and/or crosslinker.

The ratio of NCO groups to isocyanate-reactive groups is in the range from 0.9:1 to 1:0.9. The ratio of the number of urea groups formed to the number of urethane groups formed is in the range from 1:1 to 2.5:1 and preferably in the range from 1.3:1 to 2.2:1. The toluenediamine used as the starter for polyol component (2) is 2,3-diaminotoluene and/or 3,4-diaminotoluene (so-called "ortho-TDA") which may contain up to 20 wt %, preferably up to 10 wt % of 2,4- and/or 2,6-diaminotoluene.

The present invention also provides a process for producing the semi-rigid polyurethane foams of the invention by reacting (a) one or more organic polyisocyanates and/or modified organic polyisocyanates based on diphenylmethane diisocyanate and/or polyphenyl polymethylene polyisocyanate, and (b) an isocyanate-reactive component in the presence of (c) at least one catalyst, (d) 1 to 5 wt %, preferably 1.5 to 3.5 wt % and more preferably 2 to 3 wt % (based on total components (b) to (e)) of water and (e) optionally, auxiliaries and/or addition agents, wherein component (b) includes:

(1) 84 to 99.5 wt % (based on total weight of component (b)) of at least one polyether polyol based on ethylene oxide and/or propylene oxide and having a weight-average equivalent weight of ≥1000 to 3000 g/mol, preferably of ≥1200 to 2000 g/mol and an average functionality of 2 to 8, (2) 0.5 to 6 wt % (based on total weight of component(b)) of at least one polyether polyol based on ethylene oxide and/or propylene oxide with toluenediamine as starter and having a weight-average equivalent weight of 90-190 g/mol, preferably of 100 to 160 g/mol and more preferably of 110 to 150 g/mol, and (3) 0 to 10 wt % (based on total weight of component (b)) of a chain-extender and/or crosslinker, at an NCO group to isocyanate-reactive group ratio of from 0.9:1 to 1:0.9 with the ratio of the number of urea groups formed to the number of urethane groups formed being in the range from 1:1 to 2.5:1 and preferably in the range from 1.3:1 to 2.2:1.

The toluenediamine used as the starter for component (b) (2) must be 2,3-diaminotoluene and/or 3,4-diaminotoluene containing up to 20 wt % and preferably up to 10 wt % of 2,4- and/or 2,6-diaminotoluene.

Use of component (b) (2) to produce the semi-rigid polyurethane foams of the present invention results in improved properties, particularly mechanical properties, of water-blown semi-rigid polyurethane foams. The present invention makes it possible to produce foams having an improved breaking extension, a reduced compression set and lower compressive strength. As a result, the disadvantages attributed to the use of water as the blowing agent in known foam-forming systems are overcome or ameliorated in the foams produced in accordance with the present invention. At the same time, a technically and industrially sensible use is found for the unavoidably generated waste product ortho-TDA.

Isocyanate component (a) useful in the production of the foams of the present invention may include organic polyisocyanates or modified polyisocyanates based on diphenylmethane diisocyanate (MDI) and/or polyphenyl polymethylene polyisocyanate (pMDI). The MDI used can be isomerically pure or isomerically mixed. Mixtures of MDI and pMDI (sometimes referred to as crude MDI) are also suitable. Mixtures of MDI and pMDI in which the MDI isomer content is at least 50 wt %, preferably of 60 to 100 wt % are particularly advantageous. Also suitable are the so-called modified polyisocyanates based on MDI, i.e. products obtained by chemically converting the polyisocyanates. Examples of suitable modified polyisocyanates are polyisocyanates containing ester, urea, biuret, allophanate, isocyanurate and preferably carbodiimide, uretoneimine and/or urethane groups. Specific examples include polyisocyanates modified with urethane groups and based on 4,4'-MDI, 4,4'- and 2,4'-MDI isomer mixtures or crude MDI, especially those with an NCO content of from 28 to 14 wt %.

Isocyanate-reactive component (b) (1) includes polyether polyols having an average functionality of ordinarily from 2 to 8, preferably from 2 to 6 and especially from 2 to 4 and having a weight-average equivalent weight of ordinarily from 1000 to 3000 and preferably from 1200 to 2000. Mixtures of these polyether polyols with polyester polyols are also suitable.

The semi-rigid polyurethane foams of the present invention are preferably produced using crosslinking and/or chain-extending agents, i.e., component (b) (3). Useful agents of this type include polyfunctional, especially di- and trifunctional compounds having molecular weights of from 18 to 400, preferably from 62 to 300. Examples of such agents used include: di- and/or trialkanolamines, e.g., diethanolamine and triethanolamine; aliphatic diols and/or triols having 2 to 6 carbon atoms in the alkylene moiety, e.g., ethanediol, 1,4-butanediol, 1,5-pentanediol, 1,6-hexanediol, glycerol and/or trimethylolpropane; water; and low molecular weight ethoxylation and/or propoxylation products prepared from the aforementioned dialkanolamines, trialkanolamines, diols and/or triols and also aliphatic and/or aromatic diamines such as 1,2-ethanediamine, 1,4-butanediamine, 1,6-hexanediamine, 2,4- and/or 2,6-toluenediamine, 4,4'-diaminodiphenylmethane, 3,3'-di- and/or 3,3',5,5'-tetraalkyl-substituted 4,4'-diaminodiphenylmethanes as starter molecules and alkylene oxide or alkylene oxide mixtures. Preferred chain-extending agents (b) (3) include: dialkanolamines, diols and/or triols and especially ethanediol, 1,4-butanediol, 1,6-hexanediol, diethanolamine, trimethylolpropane and glycerol or mixtures of two or more thereof. The crosslinking and/or chain-extending agents are advantageously used in amounts of 0 to 10 wt %, based on total weight of component (b).

Blowing agent (d) is preferably water, which reacts with isocyanate groups to form the blowing gas carbon dioxide. The water is advantageously used in amounts from 1 to 5 wt %, preferably from 1.5 to 3.5 wt % and especially from 2.0 to 3.0 wt % (based on total weight of components (b) to (e)). The water can also be used in admixture with chemically acting (e.g., carboxylic acids) and physically active (e.g., air, nitrogen, carbon dioxide and argon) blowing agents. The required amount of blowing agent to achieve the desired foam density may be readily determined in accordance with methods known to those skilled in the art.

Catalysts (c) suitable for use in producing the foams of the present invention include the known polyurethane catalysts. It is particularly advantageous to use basic polyurethane catalysts, for example, tertiary amines such as dimethylbenzylamine, dicyclohexylmethylamine, dimethylcyclohexylamine, tetramethyldiaminodiethylether, bis(dimethylaminopropyl)urea, N-methyl- or N-ethylmorpholine, dimethylpiperazine, N-dimethylaminoethylpiperidine, 1,2-dimethylimidazole, 1-azabicyclo(2,2,0)octane, dimethylaminoethanol, 2-(N,N-dimethylaminoethoxy)ethanol, N-[2-[2-(dimethylamino)-ethoxy]ethyl]-N-methyl-1,3-propanediamine, 1,1'-((3-(dimethylamino)propyl)imino)bis-2-propanol, 1-[bis[3-(dimethylamino)propyl]amino]-2-propanol, 1,3-bis(dimethylamino)-2-propanol, 3-dimethylaminopropylurea, 2-[(2-[2-(dimethylamino)ethoxy]-ethyl)methylamino]ethanol, 2-(hydroxyethoxyethyl)-2-azabicyclo(2.2.1)heptane, hydroxypropylimidazole, 6-dimethylamino-1-hexanol, hydroxyethylimidazole, aminopropylimidazole, aminoethylimidazole, N,N',N"-tris-(dialkylaminoalkyl)hexahydrotriazine, N,N',N"-tris(dimethylaminopropyl)-s-hexahydro-triazine, di(4-dimethylaminocyclohexyl)methane and especially triethylenediamine. Also suitable, however, are metal salts, such as iron(II) chloride, zinc chloride, lead octoate, salts of bismuth, salts of titanium, salts of zinc and salts of tin, such as tin dioctoate, tin diethylhexoate and dibutyltin dilaurate and also especially mixtures of tertiary amines and organotin salts.

Useful auxiliaries and/or addition agents (e) include: surface-active agents, stabilizers, hydrolysis control agents, pore regulators, fungistatics, bacteriostatics, flame retardants, dyes, pigments and fillers. For example, surface-active substances may be used to augment the homogenization of starting materials while possibly also regulating the cell structure of foamed materials. Examples of such surface-active agents are siloxane-oxyalkylene copolymers and other organopolysiloxanes, ethoxylated alkylphenols, ethoxylated fatty alcohols, paraffin oils, castor oil/ricinoleic esters and Turkey red oil, which are used in amounts from 0.05 to 8, preferably from 0.4 to 5 parts by weight per 100 parts by weight of component (b). Further particulars concerning the above-mentioned customary auxiliary and addition agents can be found in the technical literature, for example, the monograph by J. H. Saunders and K. C. Frisch "High Polymers", volume XVI, Polyurethanes, parts 1 and 2, Interscience Publishers, 1962 and 1964 respectively, or the Kunststoff Handbuch, Polyurethanes, volume VII, Hanser Publishers, Munich, Vienna, 1st and 2nd editions, 1966 and 1983.

The semi-rigid polyurethane foams of the present invention are produced by reacting the organic, optionally modified polyisocyanates and component (b) in the presence of blowing agents and catalysts and optional auxiliaries and/or addition agents at temperatures of 0 to 100° C., preferably 25 to 50° C. in mixing ratios such that the ratio of NCO groups to isocyanate-reactive groups is in the range from 0.9:1 to 1:0.9.

The semi-rigid polyurethane foams of the present invention are advantageously produced by the one-shot process, i.e., by intensively mixing the isocyanate (i.e., component (a)) and the isocyanate-reactive component (preferably, a combination of components (b), (c), (d) and optionally (e)). The reaction mixture can be foamed in open or closed molds.

The polyurethane foams produced in accordance with the present invention have densities of 90 to 180 g/l, preferably of 120 to 160 g/l and have a significantly greater hardness and tensile strength than typical flexible foams produced in accordance with the teachings of the prior art. They have a good level of mechanical properties and are highly compatible with outer layers of thermoplastic, optionally postcrosslinked materials such as polyvinyl chloride (PVC), polypropylene (PP), acrylonitrile-butadiene-styrene (ABS), polycarbonate (PC), styrene-maleic anhydride (SMA), thermoplastic olefins (TPOs) and various thermoplastic elastomers.

The semi-rigid polyurethane foams of the present invention are particularly useful for the production of composite elements, preferably comprising a backing and a covering skin which is composed of optionally postcrosslinked and/or fiber-reinforced thermoplastics, elastomers, thermosets, wood, leather or metal.

Such composite elements can be used as components for motor vehicles, especially in lining the motor vehicle interior.

The examples which follow illustrate the invention. Parts are by weight.

EXAMPLES

The materials used in the Examples which follow were:
POLYOL A: A trifunctional polyalkylene oxide based on glycerol and propylene oxide with a 14% terminal ethylene oxide block and an OH number of 27 g KOH per gram of polyol. The equivalent weight is 2080 g/mol.
POLYOL B: A tetrafunctional polyalkylene oxide obtained by reacting ortho-diaminotoluene first with ethylene oxide and then propylene oxide. The OH number is 460 g KOH per gram of polyol and 5-15% is accounted for by unsaturated secondary NH groups. The CAS number is 67800-94-6. The equivalent weight is 122 g/mol.
POLYOL C: A trifunctional polyalkylene oxide based on glycerol and propylene oxide with 75% terminal ethylene oxide block. The OH number is 37 mg KOH per gram of polyol.
POLYOL D: A trifunctional polyester based on adipic acid, hexanediol and trimethylolpropane with an OH number of 109 mg KOH/g. The equivalent weight is 515 g/mol.
POLYOL E: A trifunctional polyalkylene oxide based on glycerol and propylene oxide with an 18% terminal ethylene oxide block. The OH number is 28 g KOH per gram of polyol. The equivalent weight is 2000 g/mol.
POLYOL F: A trifunctional polyalkylene oxide based on glycerol and propylene oxide with an 18% terminal ethylene oxide block. The OH number is 35 g KOH per gram of polyol. The equivalent weight is 1600 g/mol.
POLYOL G: A dispersion of styrene-acrylonitrile copolymer (42 wt %) in polyol F (58 wt %).
POLYOL H: A trifunctional polyalkylene oxide based on triethanolamine and propylene oxide. The OH number is 495 g KOH per gram of polyol. The equivalent weight is 115 g/mol.
POLYOL I: A polyester based on ricinoleic acid and hexanediol with an equivalent weight of 1600 g/mol.
CATALYST A: PC CAT NP712 from Performance Chemicals (Hamburg).
CATALYST B: Dabco® NE 1070 from Air Products.
CATALYST C: Desmorapid® 591F08 from Bayer MaterialScience AG.
CATALYST D: Pentahydroxypropylethyldiamine.
PASTE A: Isopur® Schwarzpaste N, a black paste from ISL Chemie, Kürten.
STABILIZER: Tegostab® B8734 LF2 is a foam stabilizer from Evonik, Essen.
PASTE B: Tegocolor® Black HI is a black paste from Evonik, Essen.

Test Description:

To determine reactivity, the polyol mixture was weighed into a cup of coated paper. The isocyanate was then added. Both components (polyol component and isocyanate component) had a temperature of 23° C. The mixture of polyol formulation and isocyanate was stirred with a Pendraulik stirrer for 5 seconds (test series B and C) or 10 seconds (test series A). "Cream time" is the time in which the liquid mixture started to expand in volume. This was usually associated with a distinctly visible change in color to a lighter hue. "Rise time" was reached once any movement of the rising foam relative to the rim of the cup appeared to have ceased.

The moldings for mechanical testing were produced in a sealable PTFE-lined aluminum mold (200×200×40 mm in size) at a mold temperature of 45° C. Both the components (polyol component and isocyanate component) had a temperature of 23° C. First the components of the polyol side were mixed with a Pendraulik stirrer in a paperboard cup, then the isocyanate was added and the mixture was stirred for 5 seconds (test series B and C) or 10 seconds (test series A). The mixture was then poured into the open mold and the mold was closed. The amount of mixture was chosen to achieve the desired average density in the core of the foam. The composite element thus formed was demolded after about 10 minutes and left at room temperature for 24 hours. Specimens were cut out of the core of the molded article and tested in accordance with the stated standard.

Test Methods:

| | |
|---|---|
| Compression set | DIN 53572 |
| Tensile strength | ISO1798 |
| Elongation | DIN 53571 |
| Foam density | DIN 53420 |
| Compressive strength at 40% compression | ISO3386-1-98 |

The formulations of the foams to be compared, especially the amount of catalyst used, were adjusted so that the same index and a comparable mixing ratio of polyol formulation and isocyanate could be used while also maintaining comparable reaction kinetics, as characterized by cream time and rise time.

Test Series A

The isocyanate used in this test series was polymeric MDI having a viscosity of 0.2 Pa·s at 25° C. (commercially available under the name Desmodur® 44V20LF from Bayer MaterialScience AG).

Test series A

| Components | OH number (mg KOH/g) | Invention | Comparison |
|---|---|---|---|
| POLYOL D | 110 | 4.85% | 4.85% |
| POLYOL E | 28 | 79.11% | 79.11% |
| POLYOL G | 20 | 7.50% | 7.50% |
| PASTE A | 30 | 0.87% | 0.87% |
| diaminodiethyltoluene isomer mixture | 630 | 0.68% | 0.68% |
| Water | 6228 | 2.62% | 2.62% |
| CATALYST C | 270 | 1.75% | 1.75% |
| POLYOL H | 500 | — | 2.62% |
| POLYOL B | 460 | 1.75% | — |
| CATALYST D | 630 | 0.87% | — |
| polyol formulation OH in mg KOH/g number (calculated) | | 51 | 52 |
| Index | | 90 | 90 |
| urea/urethane (calculated) | | 1.8 | 1.8 |
| cream time (hand foaming) | [s] | 22 | 23 |
| rise time (hand foaming) | [s] | 148 | 150 |
| core foam density of molded article | [kg/m³] | 145 | 142 |

Test series A (continued)

| Components | OH number (mg KOH/g) | Invention | Comparison |
|---|---|---|---|
| chemically firmly attached diaminotoluene in foam (calculated) | [g/m³] | 430 | 0 |
| compressive strength at 40% compression | [kPa] | 85 | 95 |
| compression set | [%] | 14 | 20 |
| tensile strength | [kPa] | 422 | 380 |
| breaking extension | [%] | 50 | 40 |

Test Series B

The isocyanate used in Test Series B was a mixture of the isocyanate that is commercially available under the name 35.5% Desmodur® 44V20LF from Bayer MaterialScience AG with 54.5% 4,4'-MDI and 10% uretdioneimine.

Test series B

| | Equivalent-weight [g/mol of NCO-reactive groups] | Invention | Comparison | Proportion of polyol formulation |
|---|---|---|---|---|
| POLYOL A | 2080 | 61 | 62 | weight % |
| POLOL B | 122 | 2 | — | weight % |
| diethanolamine | 35 | 0.45 | 1.45 | weight % |
| POLYOL C | 1515 | 1.25 | 1.25 | weight % |
| POLYOL D | 510 | 1 | 1 | weight % |
| PASTE A | 1870 | 0.25 | 0.25 | weight % |
| castor oil | | 15 | 15 | weight % |
| POLYOL I | 1600 | 15 | 15 | weight % |
| CATALYST A | | 1.3 | 1.3 | weight % |
| Water | | 2.5 | 2.5 | weight % |
| STABILIZER | | 0.25 | 0.25 | weight % |
| OH number (calculated) | | 226 | 234 | mg KOH/g |

| | Invention | Comparison | Proportion of polyol formulation |
|---|---|---|---|
| index (mol of NCO* 100/mol of NCO-reactive groups) | 95 | 95 | |
| cream time (hand foaming) | 9 | 8 | [s] |
| rise time (hand foaming) | 50 | 51 | [s] |
| density in core of foams | 133 | 130 | [kg/m³] |
| urea/urethane (calculated) | 1.41 | 1.46 | |
| chemically firmly attached diaminotoluene in foam (calculated) | 440 | 0 | [g/m³] |
| compressive strength at 40% compression | 42 | 36 | [kPa] |
| breaking extension | 74 | 73 | [%] |
| breaking extension after 3 cycles of 5 hours at 120° C. and >95% humidity | 81 | 61 | [%] |
| breaking extension after 7 days 140° C. | 56 | 43 | [%] |
| tensile strength | 387 | 356 | [kPa] |
| tensile strength after 3 cycles of 5 hours at 120° C. and >95% humidity | 226 | 200 | [kPa] |
| tensile strength after 7 days 140° C. | 232 | 193 | [kPa] |
| compression set | 11 | 10 | [%] |
| compression set after 3 cycles of 5 hours at 120° C. and >95% humidity | 23 | 26 | [%] |
| compression set after 7 days 140° C. | 18 | 18 | [%] |

Test Series C

The isocyanate used in this test series was a mixture of 35.5% of the polyisocyanate which is commercially available from Bayer MaterialScience AG under the name Desmodur® 44V20LF with 54.5% 4,4'-MDI and 10% uretdioneimine.

Test series C

| | OH number (mg KOH/g) | Invention 1 | Invention 2 | Comparison 1 | Comparison 2 |
|---|---|---|---|---|---|
| POLYOL B | 415 | 1.7% | 1.7% | | |
| Glycerol | 1827 | | | 0.8% | 0.8% |
| POLYOL C | 37 | 1.25% | 1.25% | 1.23% | 1.23% |
| POLYOL A | 27 | 91% | 91% | 91.69% | 91.69% |
| PASTE B | 98 | 0.25% | 0.25% | | |
| PASTE A | 30 | | | 0.5% | 0.5% |
| diethanolamine | 1609 | 0.45% | 0.45% | 0.43% | 0.43% |
| CATALYST A | 460 | | 1.6% | 1.6% | |
| CATALYST B | 730 | 1.6% | | | 1.6% |
| STABILIZER | 83 | 0.25% | 1.6% | 1.6% | 1.6% |
| POLYOL D | 109 | 1% | 1% | 1% | 1% |
| Water | 6228 | 2.5% | 2.5% | 2.5% | 2.5% |
| | | 100.00% | 100.00% | 100.00% | 100.00% |
| OH number of mixture (calculated) | | 52 | 48 | 56 | 60 |

| | Invention 1 | Comparison 1 | Invention 2 | Comparison 2 |
|---|---|---|---|---|
| Index[1] | 95 | 95 | 95 | 95 |
| Core density (consolidated) [kg/m³] | 125 | 127 | 125 | 133 |
| urea/urethane (calculated) | 2.1 | 1.75 | 2.1 | 1.75 |
| chemically firmly attached diaminotoluene in foam (calculated) [g/m³] | 360 | 0 | 360 | 0 |
| compressive strength at 40% compression [kPa] | 35 | 44 | 45 | 54 |
| breaking extension [%] | 84 | 81 | 79 | 78 |
| breaking extension after 3 cycles of 5 hours at 120° C. and >95% humidity [%] | 142 | 138 | 144 | 141 |
| breaking extension after 7 days 140° C. [%] | 46 | 37 | 85 | 82 |

[1]mol of NCO*100/mol of NCO-reactive groups

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane foam having a density of 90 to 180 kg/m³ and a compressive strength of from 20 to 95 kPa comprising the reaction product of
    a) at least one organic polyisocyanate and/or modified organic polyisocyanate, wherein the least one organic polyisocyanate and/or modified organic polyisocyanate is based on diphenylmethane diisocyanate and/or polyphenyl polymethylene polyisocyanate, and
    b) an isocyanate-reactive component comprising:
        (1) 84 to 99.5 weight %, based on total weight of b), of at least one polyether polyol derived from ethylene oxide and/or propylene oxide having a weight-average equivalent weight of from 1000 to 3000 g/mol and an average functionality of from 2 to 8,
        (2) 0.5 to 6 weight %, based on total weight of b), of at least one polyether polyol derived from ethylene oxide and/or propylene oxide with diaminotoluene as starter having a weight-average equivalent weight of 90-190 g/mol wherein the toluenediamine is 2,3-diaminotoluene and/or 3,4-diaminotoluene, wherein the 2,3-diaminotoluene and/or 3,4-diaminotoluene contains up to 20 weight % of 2,4- and/or 2,6-diaminotoluene and
        (3) 0 to 10 weight %, based on total weight of b), of chain-extending agent and/or crosslinker,
    formed in the presence of
    c) a catalyst,
    d) from 1 to 5 weight %, based on total weight of b) to e), of water, and
    e) optionally, auxiliaries and/or addition agents,
    at an NCO group to isocyanate-reactive group ratio of from 0.9:1 to 1:0.9 in which the ratio of the number of urea groups formed to the number of urethane groups formed is from 1:1 to 2.5:1.

2. The foam of claim 1 in which b)(2) includes from 5 to 15% amino groups, based on the amount of b)(2).

3. The foam of claim 1 in which b)(2) has an equivalent weight of from 100 to 160 g/mol.

4. A process for the production of the polyurethane foam of claim 1 comprising reacting a) with b) in the presence of c), d) and optionally, e) in amounts such that the ratio of NCO groups to isocyanate-reactive groups is in the range from 0.9:1 to 1:0.9 and the ratio of the number of urea groups formed to the number of urethane groups formed is in the range from 1:1 to 2.5:1.

5. The process of claim 4 in which b)(2) includes from 5 to 15% amino groups, based on the amount of b)(2).

6. The process of claim 4 in which b)(2) has an equivalent weight of from 100 to 160 g/mol.

7. A composite element comprising the polyurethane foam of claim 1.

8. The composite element of claim 7 further comprising a backing and a covering skin selected from the group consisting of a thermoplastic, elastomer, thermoset, wood, leather and metal.

9. The composite element of claim 8 in which the covering skin is a fiber-reinforced thermoplastic.

10. A lining for a motor vehicle interior comprising the composite of claim 8.

\* \* \* \* \*